(No Model.)
I. B. SANDERS.
CONVERTIBLE PACKAGE CARRYING BICYCLE.
No. 592,886. Patented Nov. 2, 1897.
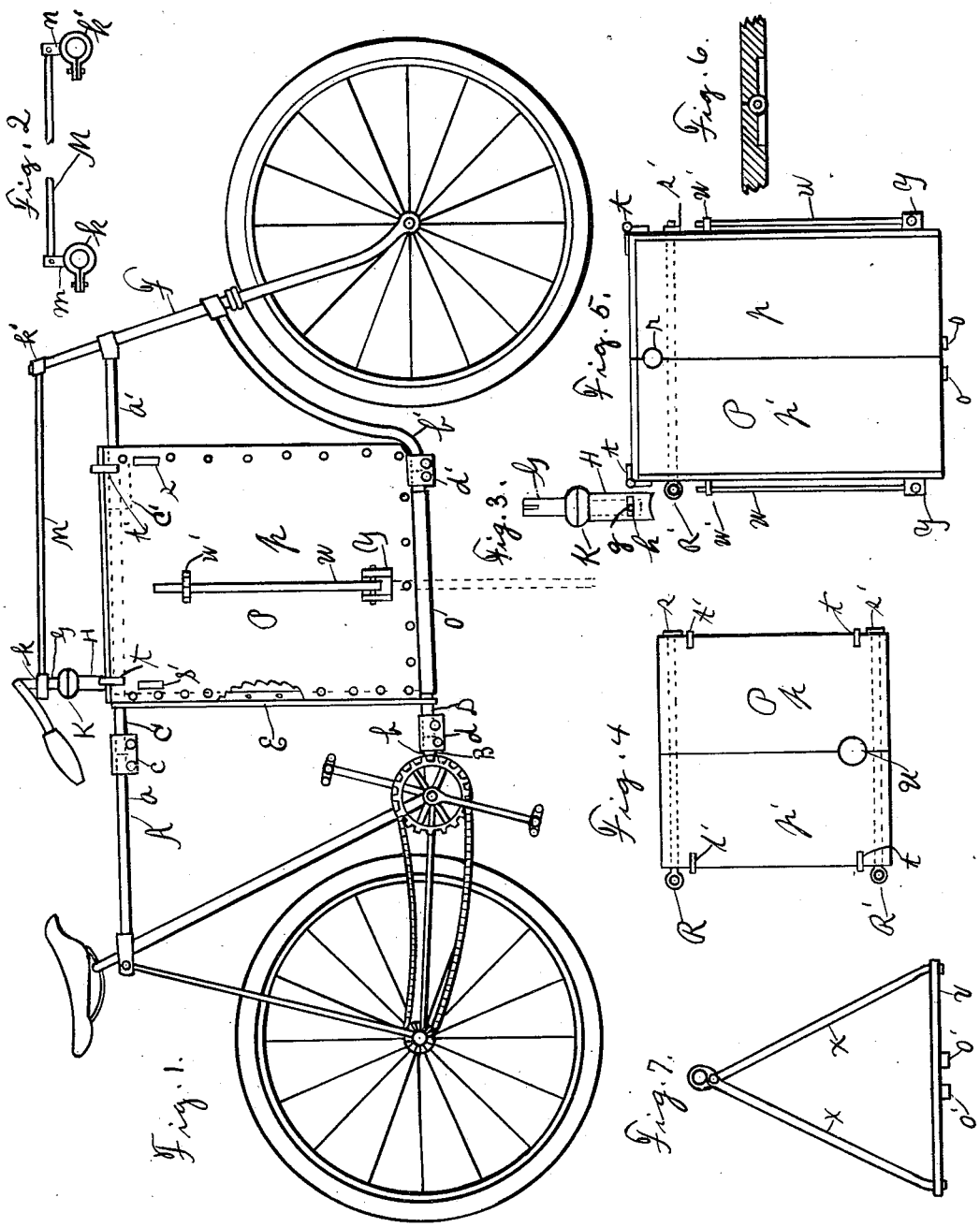
Witnesses
Parter Ball
Howard Ross
Inventor,
I. B. Sanders,
By his Attorney,
A. D. Jackson.

UNITED STATES PATENT OFFICE.

IRA B. SANDERS, OF FORT WORTH, TEXAS.

CONVERTIBLE PACKAGE-CARRYING BICYCLE.

SPECIFICATION forming part of Letters Patent No. 592,886, dated November 2, 1897.

Application filed January 22, 1897. Serial No. 620,203. (No model.)

*To all whom it may concern:*

Be it known that I, IRA B. SANDERS, a citizen of the United States, residing at Fort Worth, in the county of Tarrant and State of Texas, have invented a Convertible Package-Carrying Bicycle, of which the following is a specification.

This invention relates to a package-carrying bicycle which can be converted into a simple bicycle and to converting a bicycle into a package-carrying bicycle.

The object and advantages of this invention will be fully understood from the following description and claims when read in connection with the accompanying drawings, forming a part of this specification.

Figure 1 is a side elevation of the invention. Fig. 2 is a detail view of the cuffs and the connecting-rod for steering the bicycle. Fig. 3 is a detail view of the tubular socket for the steering-rod. Fig. 4 is a top view of the carrier-body. Fig. 5 is an end elevation of same. Fig. 6 is a broken sectional view showing how the bottom sections of the carrier are hinged together. Fig. 7 is an end elevation of a variation of the carrier.

Similar characters of reference indicate corresponding parts throughout the several views.

In carrying out the object of my invention I cut the upper and lower tubular bars of a bicycle in two parts, then separate the parts to any desirable distance and insert tubular bars between the sections of said first-named bars and join the parts with suitable clamps. The frame is then ready for the carrier-body.

Fig. 1 shows the carrier mounted. The bar A is cut into sections $a$ and $a'$ and the bar B is cut into sections $b$ and $b'$. Bar C is joined to sections $a$ and $a'$ by clamps $c$ and $c'$. The bar D is joined to sections $b$ and $b'$ by clamps $d$ and $d'$. An upright bar E is attached to tubular bars C and D and serves as a brace to strengthen the frame substantially in the middle. The handles are taken from the steering-post F and mounted in tube G. Tube G is mounted in tube H, which is attached to bar C in any suitable way. The tube G has ball-bearings in tube H at K and has a lug $g$ in the lower end, which turns in the slot $h$ in tube H. This lug may be a set-screw. It prevents tube G from coming out of tube H when steering. The steering-rod is clamped in tube G in the usual way. Clamp $k$ has an arm $m$ and clamp $k'$ has an arm $n$. The rod M is pivotally mounted in these arms. Clamp $k'$ is rigidly mounted on front tube F. The tube B when cut in two parts will have to be bent to the shape illustrated, but these parts may be manufactured as illustrated. It can be seen that the bars C and D can be removed, the sections $a$ and $a'$ and $b$ and $b'$ united by clamps $c$ and $d$, and the handles mounted in tube F at pleasure.

The carrier mounted on the frame described consists of a rectangular box P. On the bottom of the box are attached two bars $o$ $o$. The box rests on bar D between the bars $o$ $o$. The box is constructed in two sections $p$ and $p'$, which are hinged together at the bottom, as illustrated in Fig. 6. There is an aperture $r$ in each end of the box at the juncture of the two sections for the bar C. The two sections when folded together are held together by the rods R and R', which have a ring on one end. The other ends are threaded and the rods are held in place by nuts $s$ and $s'$, which are attached to the side of the box. The sections fold together and inclose bar C in aperture $r$. The top of the box has hinges $t$ and $t$ and $t'$ and $t'$. When mounted, the box is held securely in place by bar C, the bars $o$ $o$, these three preventing the box from falling out at the side, and brace E, tube H, which rests in aperture $u$, and the shoulder on section $b'$ of bar B, the three latter elements preventing forward or backward motion on the frame. In order to put the box in place, it is necessary to open the sections wide enough to receive the bar C. The bottom is placed on bar D, one of the bars $o$ $o$ being on each side of bar D. The sections are brought together at the top, inclosing bar C, and bolted together by rods R and R'. The bicycle is steered as tandems are by the rod M and its pivotal connections.

Fig. 7 illustrates a variation in the carrier. This carrier consists of a bottom $v$ and four braces $x$ $x$ $x$ $x$, one attached in each corner of the bottom $v$ by suitable nuts. The upper ends of the braces are flattened and bent, each pair making a clamp to grasp bar C.

Each pair is bolted together below bar C by suitable bolts. This carrier has bars o' o' to hold the bottom in place.

The carrier P may be made of any suitable material, but it is preferable to make it of something light.

I provide supports which are attached to the sides of box P. The supports consist of a rod W, pivoted on each side of the box in a bracket Y. When not in use, the rods are held up on the side of the box by clamps W'. To use supports, take the rods out of clamp Y and bring them to the position illustrated by dotted lines in Fig. 1.

Having fully described my invention, what I claim as new, and desire to secure by Letters Patent, is—

1. A bicycle provided with means for carrying packages consisting of the upper and lower tubular bars, said bars having detachable joints and tubular carrier-bars to be inserted between the sections of said bars, a brace between said carrier-bars, and a rectangular box resting on said lower bar, the upper carrier-bar running through said box.

2. A bicycle adapted to carry packages having the upper and lower bars provided with detachable joints, tubular carrier-bars inserted between and clamped to said bars, a brace between said carrier-bars, a rectangular box resting on the lower carrier-bar, the upper carrier-bar passing through said box, said box having bars attached to the bottom thereof one on each side of said lower bar adapted to prevent lateral motion of said box on said lower bar.

3. A bicycle adapted to carry packages having the upper and lower tubular bars provided with detachable joints and tubular carrier-bars inserted between and clamped to the sections of said first-named bars, a detachable brace between said carrier-bars, a box resting on the lower carrier-bar, bars one on each side of the lower carrier-bar attached to said box, said box being constructed in two sections hinged together, and means for locking said sections together, the upper carrier being inclosed between said sections.

4. A package-carrier for bicycles consisting of a box constructed in two sections hinged together in the bottom, two bars attached to said bottom, one bar being attached to each section, means for supporting said box consisting of the upper and lower tubular carrier-bars, said box resting on the lower bar, the sections of said box coming together and inclosing said upper bar, and means for clamping said sections together, the upper and lower tubular frame-pieces of the bicycle being provided with detachable joints whereby said carrier-bars are inserted and clamped between the sections of said frame-pieces.

5. A bicycle provided with means for carrying packages between the front and rear wheels, said means consisting of upper and lower tubular bars, a brace between said bars, a carrier resting on said lower bar, bars attached to said carrier and adapted to hold said carrier on said lower bar, means for attaching said carrier to said upper bar, and means for supporting said bars consisting of the upper and lower frame-pieces of the bicycle, said frame-pieces being provided with detachable joints whereby said carrier-bars are inserted and clamped between the sections of said frame-pieces.

IRA B. SANDERS.

Witnesses:
R. E. L. ROY,
WILLIAM T. FOX.